US012662004B2

(12) United States Patent
Sugiyama et al.

(10) Patent No.: US 12,662,004 B2
(45) Date of Patent: Jun. 23, 2026

(54) VEHICLE

(71) Applicant: TOYOTA JIDOSHA KABUSHIKI KAISHA, Aichi-ken (JP)

(72) Inventors: Midori Sugiyama, Susono (JP); Yoshihiro Sakayanagi, Mishima (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 580 days.

(21) Appl. No.: 18/364,754

(22) Filed: Aug. 3, 2023

(65) Prior Publication Data

US 2024/0051408 A1      Feb. 15, 2024

(30) Foreign Application Priority Data

Aug. 10, 2022      (JP) ................................. 2022-128215

(51) Int. Cl.
　　　*B60L 53/126*　　　(2019.01)
　　　*B60L 53/36*　　　(2019.01)
　　　*B60L 53/38*　　　(2019.01)
(52) U.S. Cl.
　　　CPC ............. *B60L 53/126* (2019.02); *B60L 53/36* (2019.02); *B60L 53/38* (2019.02)
(58) Field of Classification Search
　　　CPC ......... B60L 53/126; B60L 53/36; B60L 53/38
　　　USPC ....................................................... 320/109
　　　See application file for complete search history.

(56) References Cited

U.S. PATENT DOCUMENTS 11,546,057 B2 *　1/2023　Murakami ........... H04B 10/116
2015/0165923 A1　6/2015　Hirayama et al.
2024/0349054 A1 *　10/2024　Yamanaka ........ H04M 1/72412

FOREIGN PATENT DOCUMENTS

JP　　　2014017747 A　　1/2014

* cited by examiner

*Primary Examiner* — Nathaniel R Pelton
(74) *Attorney, Agent, or Firm* — HAUPTMAN HAM, LLP

(57)　　　　ABSTRACT

A vehicle capable of receiving electric power from a ground power supply device includes: a first communication device that wirelessly communicates with the ground power supply device by means of a first communication method; a second communication device that wirelessly communicates with the ground power supply device by means of a second communication method having a higher directivity than the first communication method; and a control device connected to the first communication device and the second communication device. The control device configured to pair the vehicle and the ground power supply device when the control device receives identification information of the same ground power supply device by communication in the first communication method and communication in the second communication method.

8 Claims, 7 Drawing Sheets

FIG. 6

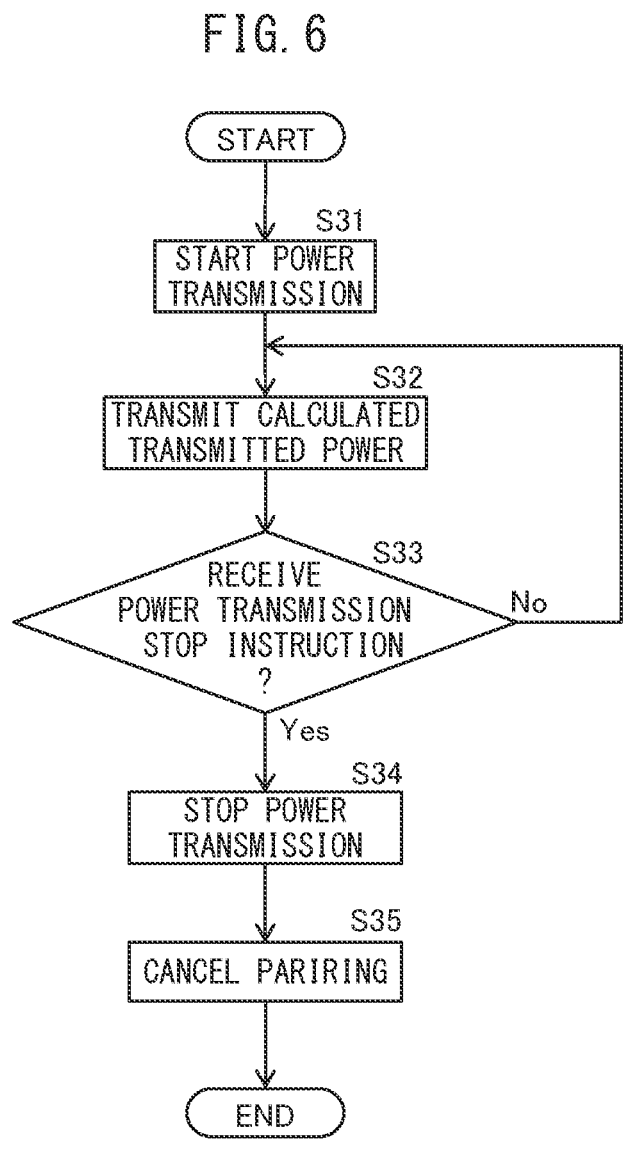

```
        ( START )
            │
            │ S31
            ▼
   ┌─────────────────┐
   │  START  POWER   │
   │  TRANSMISSION   │
   └─────────────────┘
            │
            │◄──────────────────────────┐
            │ S32                        │
            ▼                            │
   ┌─────────────────┐                  │
   │TRANSMIT CALCULATED│                 │
   │TRANSMITTED  POWER│                  │
   └─────────────────┘                  │
            │                            │
            │       S33                  │
            ▼                            │
          RECEIVE                        │
    ◇ POWER TRANSMISSION ◇──── No ───────┘
      STOP  INSTRUCTION
            ?
            │
            │ Yes
            │ S34
            ▼
   ┌─────────────────┐
   │   STOP  POWER   │
   │  TRANSMISSION   │
   └─────────────────┘
            │
            │ S35
            ▼
   ┌─────────────────┐
   │ CANCEL PARIRING │
   └─────────────────┘
            │
            ▼
        ( END )
```

FIG. 7

VEHICLE

RELATED APPLICATIONS

The present application claims priority of Japanese Patent Application No. 2022-128215 filed Aug. 10, 2022, the disclosure of which is hereby incorporated by reference herein in its entirety.

FIELD

The present disclosure relates to a vehicle capable of receiving electric power from a ground power supply device.

BACKGROUND

Conventionally, there has been known a contactless power supply system in which electric power is supplied to a parked vehicle in a contactless manner from a ground power supply device installed on the ground, using a transmission system such as magnetic field coupling (electromagnetic induction), electric field coupling, magnetic resonant coupling (magnetic field resonance), and electric resonant coupling (electric field resonance). In such a contactless power supply system, one of a plurality of ground power supply devices and a vehicle are paired with each other by wireless communication, and electric power is supplied in a contactless manner between the paired ground power supply device and the vehicle. For example, an in-vehicle communication apparatus and a communication method are known in which an inquiry signal is transmitted from a vehicle to an unspecified number of ground power supply devices, and when a response signal is received only from one ground power supply device by gradually decreasing the transmission power, pairing is performed between the one ground power supply device and the vehicle (for example, refer to JP2014-017747A).

SUMMARY

However, when the plurality of ground power supply devices are disposed close to each other and there is an obstacle that causes radio interference, a vehicle may erroneously pair with the ground power supply device at a remote position instead of the ground power supply device at the nearest position.

In view of the above problems, an object of the present disclosure is to suppress erroneous pairing between a ground power supply device and a vehicle.

The gist of the present disclosure is as follows.

(1) A vehicle capable of receiving electric power from a ground power supply device, comprising:

a first communication device that wirelessly communicates with the ground power supply device by means of a first communication method;

a second communication device that wirelessly communicates with the ground power supply device by means of a second communication method having a higher directivity than the first communication method; and a control device connected to the first communication device and the second communication device, wherein the control device pairs the vehicle and the ground power supply device when the control device receives identification information of the same ground power supply device by communication in the first communication method and communication in the second communication method.

(2) The vehicle according to above (1), wherein the control device executes a vehicle moving process for moving the vehicle when the control device does not receive the identification information of the ground power supply device by communication in the second communication method or the control device receives the identification information of a plurality of ground power supply devices by communication in the second communication method, even though the control device receives identification information of the ground power supply device by communication in the first communication method.

(3) The vehicle according to above (2), wherein the control device executes a manual process for causing an occupant of the vehicle to manually pair when the control device does not receive the identification information by the communication in the second communication method or when the control device receives the identification information of the plurality of ground power supply devices by the communication in the second communication method, even though the vehicle moving process has been executed.

(4) A vehicle according to any one of above (1) to (3), wherein the control device executes a manual process for causing an occupant of the vehicle to manually pair, when the identification information of the ground power supply device received by communication in the second communication method is not included in the identification information of the ground power supply device received by communication in the first communication method.

(5) The vehicle according to any one of above (1) to (4), wherein the control device calculates a power supply efficiency from the ground power supply device to the vehicle when electric power is supplied from the ground power supply device to the vehicle, and makes the first communication device transmit a power transmission stop instruction to the ground power supply device when the calculated power supply efficiency is less than a predetermined value.

(6) The vehicle according to any one of above (1) to (5), wherein the communication in the second communication method is one-way communication from the ground power supply device to the second communication device.

(7) The vehicle according to any one of above (1) to (6), wherein a communication speed according to the second communication method is lower than a communication speed according to the first communication method.

(8) The vehicle according to any one of above (1) to (7), wherein the second communication method is communication using infrared rays or ultrasonic waves.

BRIEF DESCRIPTION OF DRAWINGS

FIG. 6 is a flowchart showing a flow of power transmission process.

FIG. 7 is a flowchart showing a flow of the power receiving process.

DESCRIPTION OF EMBODIMENTS

Figure 1:
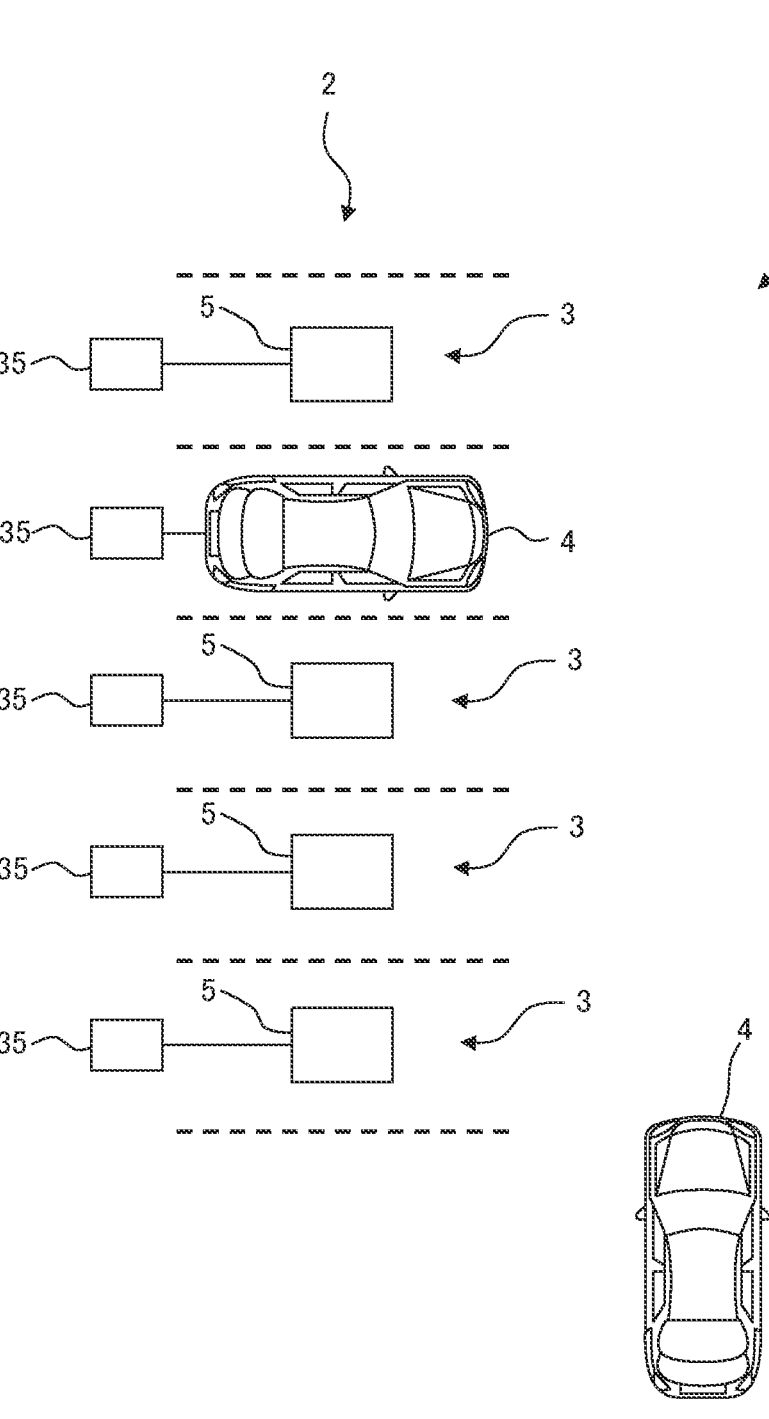
FIG. 1 is a diagram schematically showing an overall configuration of a contactless power supply system including a vehicle according to one embodiment.

Hereinafter, embodiments will be described in detail with reference to the drawings. In the following description, the same reference numerals are given to the same constituent elements.

<Configuration of Contactless Power Supply System>

FIG. 1 is a diagram schematically showing an overall configuration of a contactless power supply system 1 including a vehicle 4 according to an embodiment. As shown in FIG. 1, the contactless power supply system 1 includes a plurality of ground power supply devices 3 arranged in a charging station 2, and a vehicle 4 capable of receiving electric power from the ground power supply device 3. In the contactless power supply system 1 according to the present embodiment, electric power is transmitted in a contactless manner by magnetic resonant coupling (magnetic field resonance) from the ground power supply device 3 to the vehicle 4.

The ground power supply device 3 is installed corresponding to each parking section in the charging station 2. Therefore, one ground power supply device 3 is provided in one parking section. Each of the ground power supply devices 3 has one power transmission device 5, which will be described later.

<Configuration of Ground Power Supply Device>

Figure 2:
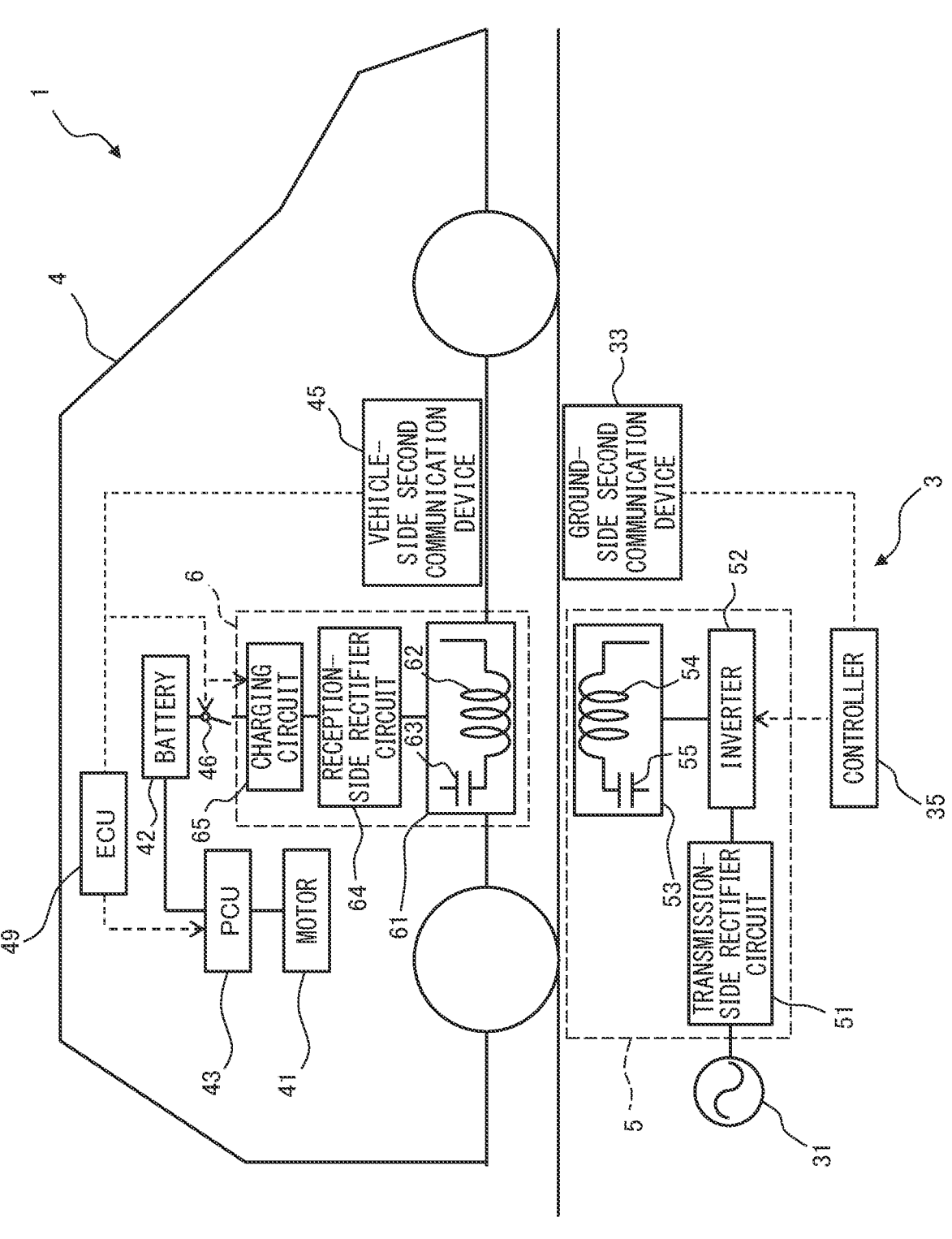
FIG. 2 is a diagram schematically showing a configuration of one ground power supply device and one vehicle constituting the contactless power supply system.

Next, the configuration of the ground power supply device 3 will be described with reference to FIGS. 2 and 3. FIG. 2 is a diagram schematically showing the configuration of one ground power supply device 3 and one vehicle 4 constituting the contactless power supply system 1.

As show in FIG. 2, the ground power supply device 3 includes a power transmission device 5 and a power source 31 as devices related to power transmission to the vehicle 4. The power transmission device 5 is configured to transmit electric power to the vehicle 4 in a contactless manner and is embedded in the ground in the center of each parking section of the charging station 2.

The power source 31 supplies electric power to the power transmission device 5. The power source 31 is, for example, a commercial AC power source that supplies single-layer AC power. Note that the power source 31 may be another type of AC power source that supplies three-phase AC power, or may be a DC power source such as a fuel cell.

The power transmission device 5 transmits the electric power supplied from the power source 31 to the vehicle 4 in a contactless manner. The power transmission device 5 includes a transmission-side rectifier circuit 51, an inverter 52, and a transmission-side resonance circuit 53. In the power transmission device 5, the AC power supplied from the power source 31 is rectified in the transmission-side rectifier circuit 51 and is converted into a DC current. Then, the DC current is converted into AC power in the inverter 52, and the AC power is supplied to the transmission-side resonance circuit 53.

Specifically, the transmission-side rectifier circuit 51 rectifies the AC power supplied from the power source 31 to convert the AC power into DC power, and supplies the DC power to the inverter 52. The transmission-side rectifier 51 is, for example, an AC/DC converter. The inverter 52 converts the DC power supplied from the transmission-side rectifier circuit 51 into AC power (high-frequency power) having a frequency higher than that of the AC power of the power source 31, and supplies the high-frequency power to the transmission-side resonance circuit 53. The transmission-side resonance circuit 53 includes a resonator composed of a coil 54 and a capacitor 55. Various parameters (the outer diameter and the inner diameter of the coil 54, the number of turns of the coil 54, the capacitance of the capacitor 55, and the like) of the coil 54 and the capacitor 55 are determined so that the resonance frequency of the transmission-side resonance circuit 53 becomes a predetermined set value. When the high-frequency power is supplied from the inverter 52 to the transmission-side resonance circuit 53, the transmission-side resonance circuit 53 generates an alternating magnetic field for transmitting power. When the power source 31 is a DC power source, the transmission-side rectifier circuit 51 may be omitted.

Figure 3:
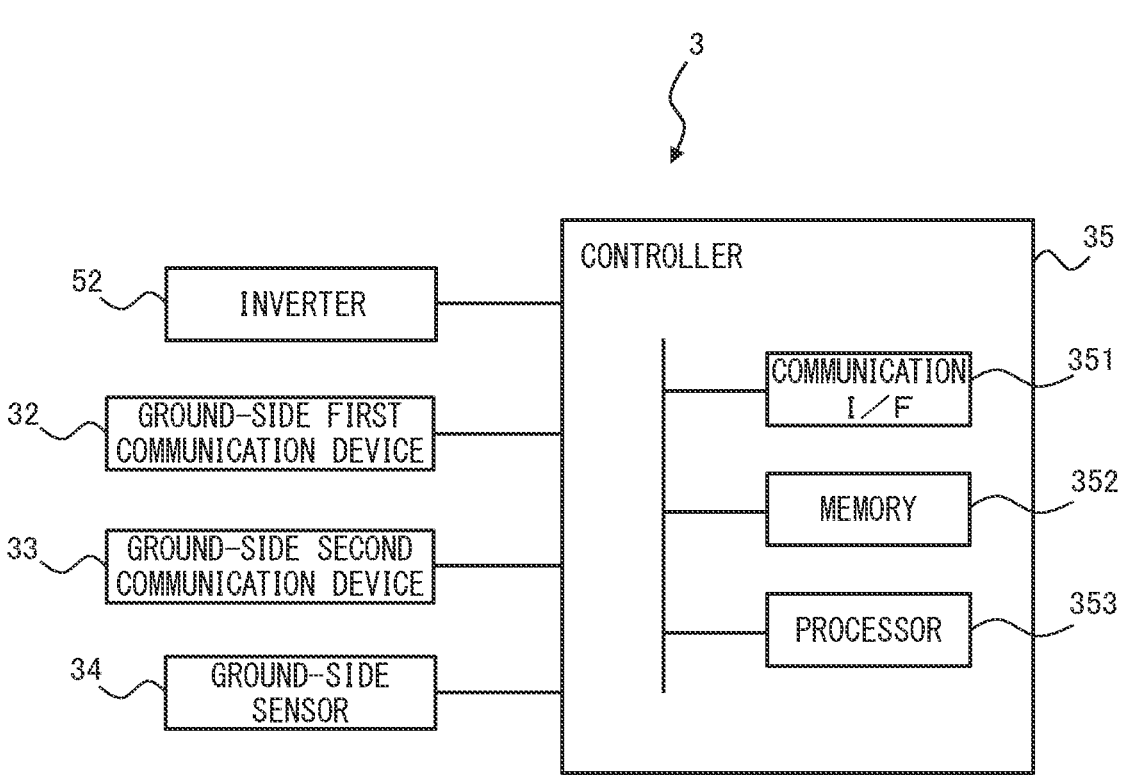
FIG. 3 is a block diagram schematically showing a configuration of a ground power supply device.

FIG. 3 is a block diagram schematically showing a configuration of the ground power supply device 3. As shown in FIGS. 2 and 3, the ground power supply device 3 further includes a ground-side first communication device 32, a ground-side second communication device 33, a ground-side sensor 34, and a controller 35. The inverter 52, the ground-side first communication device 32, the ground-side second communication device 33, and the ground-side sensor 34 of the power transmission device 5 are connected to the controller 35 via a signal line.

The ground-side first communication device 32 wirelessly communicates with a vehicle-side first communication device 44, which will be described later, of the vehicle 4. The ground-side second communication device 33 wirelessly communicates with a vehicle-side second communication device 45, which will be described later, of the vehicle 4. The communication in the ground-side first communication device 32 and the ground-side second communication device 33 will be described later.

The ground-side sensor 34 detects the state of the ground power supply device 3. In the present embodiment, the ground-side sensor 34 includes, for example, a power transmission device current sensor that detects a current flowing through various devices of the power transmission device 5 (in particular, the transmission-side resonance circuit 53, the inverter 52, and the transmission-side rectifier circuit 51), and a power transmission device voltage sensor that detects a voltage applied to various devices of the power transmission device 5. The output of the ground-side sensor 34 is input to the controller 35.

The controller 35 is, for example, a general-purpose computer, and executes various controls of the ground power supply device 3. For example, the controller 35 is electrically connected to the inverter 52 of the power transmission device 5, and controls the inverter 52 to control power transmission by the power transmission device 5. Further, the controller 35 controls the ground-side first communication device 32 and the ground-side second communication device 33. Therefore, the controller 35 functions as a ground-side control device that controls the power transmission device 5, the ground-side first communication device 32, and the ground-side second communication device 33.

The controller 35 includes a communication interface 351, a memory 352, and a processor 353. The communication interface 351, the memory 352, and the processor 353 are connected to each other via a signal line.

The communication interface 351 has an interface circuit for connecting the controller 35 to various devices (for example, the inverter 52, the ground-side first communication device 32, the ground-side second communication device 33, and the like) constituting the ground power supply device 3. The controller 35 communicates with other devices via the communication interface 351.

The memory 352 includes, for example, a volatile semiconductor memory (for example, RAM), a non-volatile semiconductor memory (for example, ROM), and the like. The memory 352 stores computer programs for executing various kinds of process in the processor 353, various kinds of data used when various kinds of process are executed by the processor 353, and the like. The memory 352 stores, for example, identification information (for example, an identification number) of each ground power supply device 3.

The processor 353 includes one or more CPU (Central Processing Unit) and its peripheral circuitry. The processor 353 may further include an arithmetic circuit such as a logical arithmetic unit or a numerical arithmetic unit. The processor 353 executes various kinds of process based on the computer programs stored in the memory 352.

<Configuration of Vehicle>

Figure 4:
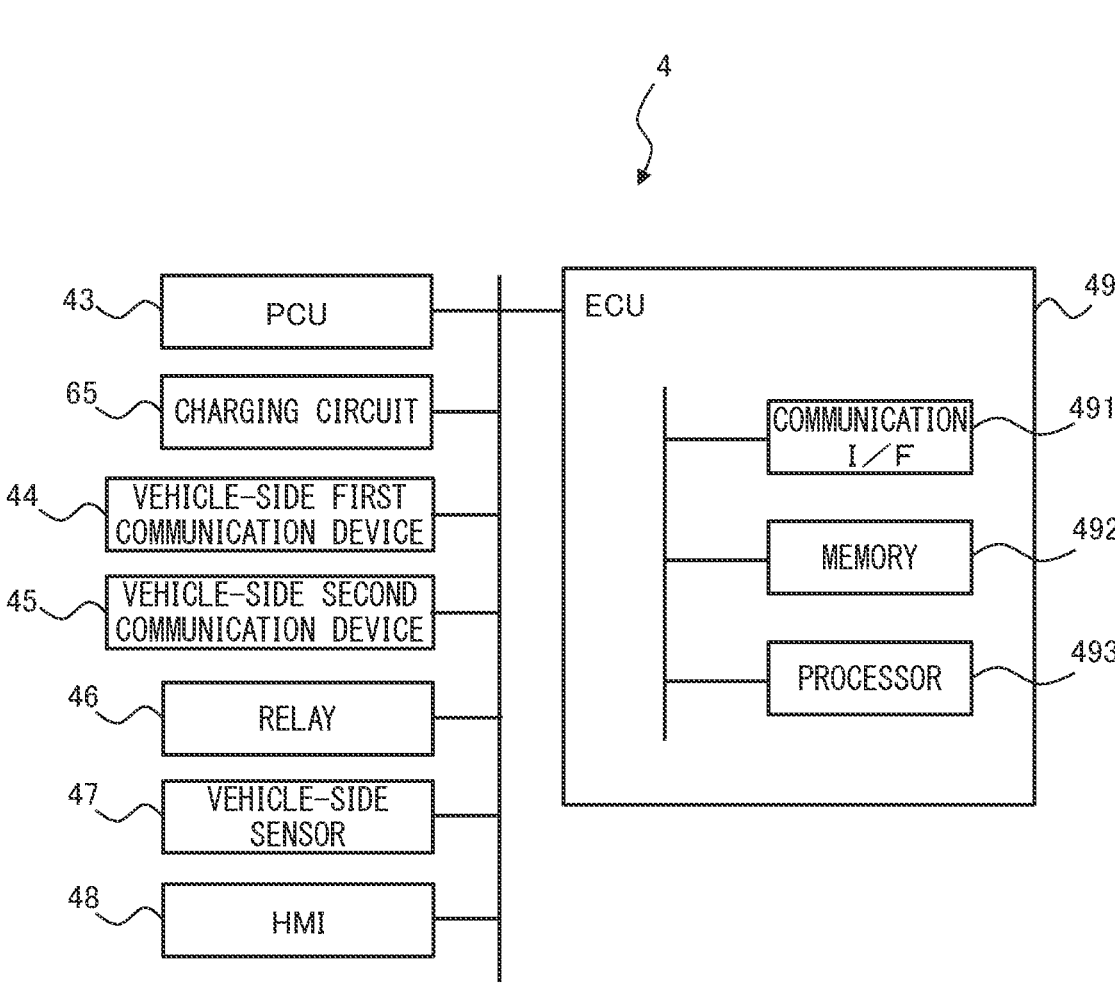
FIG. 4 is a block diagram schematically showing a configuration of a vehicle.

Next, the configuration of the vehicle 4 will be described with reference to FIGS. 2 and 4. FIG. 4 is a block diagram schematically showing a configuration of the vehicle 4. As shown in FIG. 2, the vehicle 4 includes a motor 41, a battery 42, a power control unit (PCU) 43, and a power receiving device 6, as devices related to power reception and devices related to use of received power. In the present embodiment, the vehicle 4 is a battery-powered vehicle (BEV) in which only the motor 41 drives the vehicle 4. However, the vehicle 4 may be a hybrid electric vehicle (HEV) in which an internal combustion engine, in addition to the motor 41, drives the vehicle 4.

The motor 41 is, for example, an AC synchronous motor, and functions as an electric motor and a generator. When the motor 41 functions as an electric motor, the motor 41 is driven by the electric power stored in the battery 42 as a power source. The output of the motor 41 is transmitted to the wheels via a speed reducer and an axle.

The battery 42 is a rechargeable secondary battery, and is composed of, for example, a lithium-ion battery, a nickel-hydrogen battery, or the like. The battery 42 stores electric power necessary for the vehicle 4 to travel (for example, driving electric power of the motor 41). When the electric power received by the power receiving device 6 is supplied, the battery 42 is charged. When the battery 42 is charged, the charge rate (SOC: State of Charge) of the battery 42 is restored.

The PCU 43 is electrically connected to the battery 42 and the motor 41. The PCU 43 includes an inverter, a boost converter, and a DC/DC converter. The inverter converts the DC power supplied from the battery 42 into AC power, and supplies the AC power to the motor 41. The boost converter boosts the voltage as necessary when the electric power stored in the battery 42 is supplied to the motor 41. The DC/DC converter steps down the voltage of the battery 42 when the electric power stored in the battery 42 is supplied to an electronic device such as a headlight.

The power receiving device 6 receives power from the power transmitting device 5 in a contactless manner, and supplies the received power to the battery 42. The power receiving device 6 includes a reception-side resonance circuit 61, a reception-side rectifier circuit 64, and a charging circuit 65.

The reception-side resonance circuit 61 is disposed at the bottom of the vehicle 4 so that the distance from the road surface is reduced. In the present embodiment, the reception-side resonance circuit 61 is disposed at the center of the vehicle 4 in the vehicle width direction. The reception-side resonance circuit 61 has the same configuration as the transmission-side resonance circuit 53, and has a resonator composed of a coil 62 and a capacitor 63. Various parameters (the outer diameter and the inner diameter of the coil 62, the number of turns of the coil 62, the capacitance of the capacitor 63, and the like) of the coil 62 and the capacitor 63 are determined so that the resonance frequency of the reception-side resonance circuit 61 coincides with the resonance frequency of the transmission-side resonance circuit 53.

As shown in FIG. 2, when the alternating magnetic field is generated by the transmission-side resonance circuit 53 when the reception-side resonance circuit 61 faces the transmission-side resonance circuit 53, the vibration of the alternating magnetic field is transmitted to the reception-side resonance circuit 61 that resonates at the same resonance frequency as the transmission-side resonance circuit 53. As a result, an induced current flows through the reception-side resonance circuit 61 by electromagnetic induction, and an induced electromotive force is generated in the reception-side resonance circuit 61 by the induced current. That is, the transmission-side resonance circuit 53 transmits electric power to the reception-side resonance circuit 61, and the reception-side resonance circuit 61 receives electric power from the transmission-side resonance circuit 53.

The reception-side rectifier circuit 64 is electrically connected to the reception-side resonance circuit 61 and the charging circuit 65. The reception-side rectifier circuit 64 rectifies the AC power supplied from the reception-side resonance circuit 61 to convert into DC power, and supplies the DC power to the charging circuit 65. The reception-side rectifier 64 is, for example, an AC/DC converter.

The charging circuit 65 is electrically connected to the reception-side rectifier circuit 64 and the battery 42. In particular, the battery 42 is connected via a relay 46. The charging circuit 65 converts the DC power supplied from the reception-side rectifier circuit 64 into a voltage level of the battery 42, and supplies the converted power to the battery 42. When the electric power transmitted from the power transmitting device 5 is supplied to the battery 42 by the power receiving device 6, the battery 42 is charged. The charge circuitry 65 is, for example, a DC/DC converter.

As shown in FIGS. 2 and 4, the vehicle 4 further includes a vehicle-side first communication device 44, a vehicle-side second communication device 45, a relay 46, a vehicle-side sensor 47, a HMI (Human Machine Interface) 48, and an electronic control unit (ECU) 49. The charging circuitry 65, the vehicle-side first communication device 44, the vehicle-side second communication device 45, the relay 46, the vehicle-side sensor 47, the HMI 48, and the ECU 49 of the power receiving device 6 are connected to each other via an in-vehicle network conforming to standards such as CAN (Controller Area Network).

The vehicle-side first communication device 44 wirelessly communicates with the ground-side first communication device 32. The vehicle-side second communication device 45 wirelessly communicates with the ground-side second communication device 33.

Communication in the vehicle-side first communication device 44 and the vehicle-side second communication device 45 will be described later.

The relay 46 switches the connection state between the charging circuit 65 and the battery 42. When the charging circuit 65 and the battery 42 are disconnected by the relay 46, no current flows from the power receiving device 6 to the battery 42, and therefore, substantially no power is supplied. The connecting state of the relay 46 is controlled by the ECU 49.

The vehicle-side sensor 47 detects the state of the vehicle 4. In the present embodiment, the vehicle-side sensor 47 includes, for example, a power receiving device current sensor that detects a current flowing through various devices of the power receiving device 6 (in particular, the reception-side resonant circuit 61 and the reception-side rectifying circuit 64), a power receiving device voltage sensor that detects a voltage applied to various devices of the power receiving device 6, and a SOC sensor that detects a charge rate of the battery 42. The output of the vehicle-side sensor 47 is inputted to the ECU 49.

The HMI 48 notifies the occupant of the vehicle 4 of the notification information received from the ECU 49. Therefore, the HMI 48 functions as a notification device that notifies the occupant of the information. Specifically, the HMI 48 includes, for example, a display device such as a liquid crystal display and a speaker. Further, the HMI 48 receives an input from the occupant and transmits the received input to the ECU 49. Therefore, the HMI 48 functions as an input device that receives an input from an occupant. Specifically, the HMI 48 includes a touch panel, a switch, a button, or a remote controller.

The ECU 49 executes various controls of the vehicle 4. For example, the ECU 49 controls the charging circuitry 65 to control the charging of the battery 42 by the electric power transmitted from the power transmission device 5. The ECU 49 also controls PCU 33 to control the transfer of electric power between the battery 42 and the motor 41. Further, the ECU 49 controls the vehicle-side first communication device 44 and the vehicle-side second communication device 45. Therefore, the ECU 49 functions as a vehicle-side control device that controls the power receiving device 6, PCU 33, the vehicle-side first communication device 44, and the vehicle-side second communication device 45.

The ECU 49 includes a communication interface 491, a memory 492, and a processor 493. The communication interface 491, the memory 492, and the processor 493 are connected to each other via a signal line.

The communication interface 491 includes interface circuitry for connecting the ECU 49 to an in-vehicle networking. The ECU 49 communicates with other devices via the communication interface 491.

The memory 492 includes, for example, a volatile semiconductor memory (for example, RAM) and a non-volatile semiconductor memory (for example, ROM). The memory 492 stores a computer program for executing various kinds of process in the processor 493, various kinds of data used when various kinds of process are executed by the processor 493, and the like.

The processor 493 includes one or more CPU (Central Processing Unit) and its peripheral circuitry. The processor 493 may further include an arithmetic circuit such as a logical arithmetic unit or a numerical arithmetic unit. The processor 493 executes various kinds of process based on a computer program stored in the memory 492.

<Configuration of Communication System>

In the contactless power supply system 1 as shown in FIG. 1, in order to transmit electric power in a contactless manner from the ground power supply device 3 to the vehicle 4, it is necessary to pair the ground power supply device 3 and the vehicle 4, and therefore, it is necessary to pair the power transmission device 5 and the power reception device 6. In addition, it is necessary to transmit and receive information related to power transmission between the ground power supply device 3 and the vehicle 4. For pairing the devices and transmitting vehicle information in such a manner, the ground power supply device 3 includes a ground-side first communication device 32 and a ground-side second communication device 33, and the vehicle 4 includes a vehicle-side first communication device 44 and a vehicle-side second communication device 45.

The ground-side first communication device 32 is an example of a communication device provided in the ground power supply device 3 that wirelessly communicates with another device, in particular, the vehicle-side first communication device 44 of the vehicle 4, by a first communication method. The vehicle-side first communication device 44 is an example of a communication device provided in the vehicle 4 that wirelessly communicates with another device, in particular, the ground-side first communication device 32 of the ground power supply device 3, by the first communication method. In the present embodiment, the ground-side first communication device 32 and the vehicle-side first communication device 44 are formed to be capable of bidirectional communication by the first communication method.

In the present embodiment, for example, short-range wireless communication is used as the first communication method. The short-range wireless communication is a communication having a communication distance shorter than that of wide-area wireless communication, and specifically, for example, a communication having a communication distance of less than 10 meters. As the short-range wireless communication, various short-range wireless communication with a short communication distance can be used, and for example, communication conforming to any communication standard (for example, Wi-Fi, Bluetooth, or ZigBee) developed by a IEEE, ISO, IEC or the like is used. As a technique for short-range wireless communication, for example, RFID (Radio Frequency Identification), DSRC (dedicated Short Range Communication), and the like are used.

On the other hand, the ground-side second communication device 33 is an example of a communication device provided in the ground power supply device 3 that wirelessly communicates with another device, in particular, the vehicle-side second communication device 45 of the vehicle 4, by a second communication method. The vehicle-side second communication device 45 is an example of a communication device provided in the vehicle 4 that wirelessly communicates with another device, in particular, the ground-side second communication device 33 of the ground power supply device 3, by the second communication method. In the present embodiment, the ground-side second communication device 33 and the vehicle-side second communication device 45 are formed to be able to communicate unidirectionally from the ground-side second communication device 33 of the ground power supply device 3 to the vehicle-side second communication device 45 by the second communication method. Therefore, in the present embodiment, the ground-side second communication device 33 functions as a transmitter, and the vehicle-side second communication device functions as a receiver.

In the present embodiment, communication with higher directivity than the first communication method is used, as the second communication method. Further, in the present embodiment, communication having a shorter communication distance than the first communication method is used, as the second communication method. In addition, in the present embodiment, the communication speed according to the second communication method is lower than the communication speed according to the first communication method. Specifically, in the present embodiment, as the second communication method, communication using infrared rays or ultrasonic waves can be used, and for example, communication conforming to any communication standard (for example, IrDA DATA) formulated by IrDA or the like, or communication not particularly conforming to the communication standard is used.

The ground-side second communication device 33 and the vehicle-side second communication device 45 may be configured to be capable of bidirectional communication by the second communication method. When infrared communication is used as the second communication method, the ground-side second communication device 33 includes an infrared transmitter and an infrared receiver, and similarly, the vehicle-side second communication device 45 includes an infrared transmitter and an infrared receiver.

<Pairing Process>

Incidentally, as described above, when transmitting electric power in a contactless manner from the ground power supply device 3 to the vehicle 4, it is necessary to transmit and receive information related to power transmission between the vehicle 4 and the ground power supply device 3. Specifically, for example, it is necessary to transmit, from the vehicle 4 to the ground power supply device 3, a required power (or a required electric energy) requesting to receive electric power from the ground power supply device 3, a current received electric power, a power transmission stop request, and the like. Further, it is necessary to transmit, from the vehicle 4 to the ground power supply device 3, various parameters of the coil 62 and the capacitor 63 of the power reception device 6 (the outer diameter and the inner diameter of the coil 62, the number of turns of the coil 62, the capacitance of the capacitor 63, and the like), the height of the coil 62 from the ground, and information related to the power reception device 6 such as the resonance frequency of the power reception side resonance circuit 61. On the other hand, it is necessary to transmit, for example, the current transmitted electric power or the like from the ground power supply device 3 to the vehicle 4.

In order to transmit and receive information related to power transmission between the vehicle 4 and the ground power supply device 3, it is necessary to communicate at a certain high communication speed. Therefore, in the present embodiment, such information is transmitted and received by the first communication method.

Here, each of the plurality of ground power supply devices 3 of the charging station 2 periodically outputs an inquiry signal from the ground-side first communication device 32. The inquiry signal includes identification information of the corresponding ground power supply device 3. Accordingly, the vehicle 4 receives the inquiry signal by the vehicle-side first communication device 44, so that it is possible to acquire the identification information of the ground power supply device 3 that is within the range in which the radio waves reach by the first communication method.

However, the directivity of communication in the first communication method is low. Therefore, the vehicle-side first communication device 44 of the vehicle 4 that has stopped in one parking section of the charging station 2 receives inquiry signals from a plurality of the ground-side first communication devices 32. Therefore, the ECU 49 of the vehicle 4 cannot identify the ground power supply device 3 corresponding to the parking section in which the vehicle 4 is stopped by the signals received by the vehicle-side first communication device 44 of the vehicle 4.

In addition, in a case where a plurality of inquiry signals is received, it is conceivable to pair the vehicle 4 and the ground power supply device 3 which have transmitted the inquiry signal having the largest radio wave intensity. However, when the pairing is performed in this way, for example, when there is an obstacle causing radio interference in the vicinity, it is not always possible to pair the vehicle 4 and the ground power supply device 3 corresponding to the parking section where the vehicle 4 is stopped. That is, the pairing cannot necessarily be appropriately performed only by the communication using the first communication method.

Therefore, in the present embodiment, each of the plurality of ground power supply devices 3 of the charging station 2 periodically outputs the inquiry signals from the ground-side second communication device 33. The inquiry signal also includes identification information of the corresponding ground power supply device 3. Accordingly, the vehicle 4 can acquire the identification information of the corresponding ground power supply device 3 by receiving the inquiry signal by the vehicle-side second communicator 45. In the present embodiment, when the vehicle-side first communication device 44 and the vehicle-side second communication device 45 receive the inquiry signal including the identification information of the same ground power supply device 3, the ECU 49 pairs the vehicle 4 with the ground power supply device 3. That is, when the ECU 49 receives the identification information of the same ground power supply device 3 by the communications in the first communication method and the communication in the second communication method, it pairs the vehicle 4 with the ground power supply device 3.

Here, the second communication method is a highly directional communication method. Therefore, the vehicle-side second communication device 45 can communicate with the ground-side second communication device 33 of the ground power supply device 3 corresponding to the parking section in which the vehicle 4 is stopped. On the other hand, the vehicle-side second communication device 45 cannot communicate with the ground-side second communication device 33 of the ground power supply device 3 corresponding to a parking section different from the parking section in which the vehicle 4 is stopped. Therefore, according to the communication by the second communication method, it is possible to specify the ground power supply device 3 corresponding to the parking section in which the vehicle 4 is stopped.

On the other hand, in the present embodiment, the communication speed according to the second communication method is relatively low. Therefore, in the communication according to the second communication method, it is not always possible to appropriately transmit and receive the information related to the power transmission between the ground power supply device 3 and the vehicle 4. On the other hand, in the present embodiment, when pairing is performed, communication by the first communication method is also secured between the vehicle 4 and the ground power supply device 3 corresponding to the parking section in which the vehicle 4 is stopped. Therefore, it is possible to appropriately transmit and receive information related to power transmission between the ground power supply device 3 and the vehicle 4.

In addition, in the present embodiment, the ECU 49 executes the vehicle-moving process when the inquiry signal is not received from the ground-side second communication device 33 or when the inquiry signal is received from a plurality of ground-side second communication devices 33, despite receiving one or a plurality of inquiry signals from the ground-side first communication device 32. That is, the ECU 49 executes the vehicle-moving process when the identification information of the ground power supply device 3 is not received or the identification information of a plurality of ground power supply devices 3 is received by the communication according to the second communication method, despite receiving the identification information of the ground power supply device 3 by the communication according to the first communication method. The vehicle-moving process is a process for moving the vehicle 4 on which the ECU 49 is mounted, and includes, for example, causing the display of the HMI 48 to display an image or message for prompting the occupant to move, or causing the speaker of the HMI 48 to output a sound for prompting the occupant to move.

Here, in a case where although the identification information of the ground power supply device 3 is received by means of the communication according to the first communication method, the identification information is not received by means of the communication according to the second communication method or a plurality of pieces of identification information are received, it is highly likely that the vehicle 4 is not appropriately stopped on one ground power supply device 3. Specifically, it is highly likely that the power reception device 6 of the vehicle 4 is located away from the power transmission device 5 of the ground power supply device 3. When the vehicle 4 is not properly stopped on the ground power supply device 3, the efficiency is low even when electric power is transmitted in a contactless manner. On the other hand, in the present embodiment, by urging the vehicle 4 to move in such a case, the vehicle 4 can be appropriately stopped on one ground power supply device 3.

Figure 5:
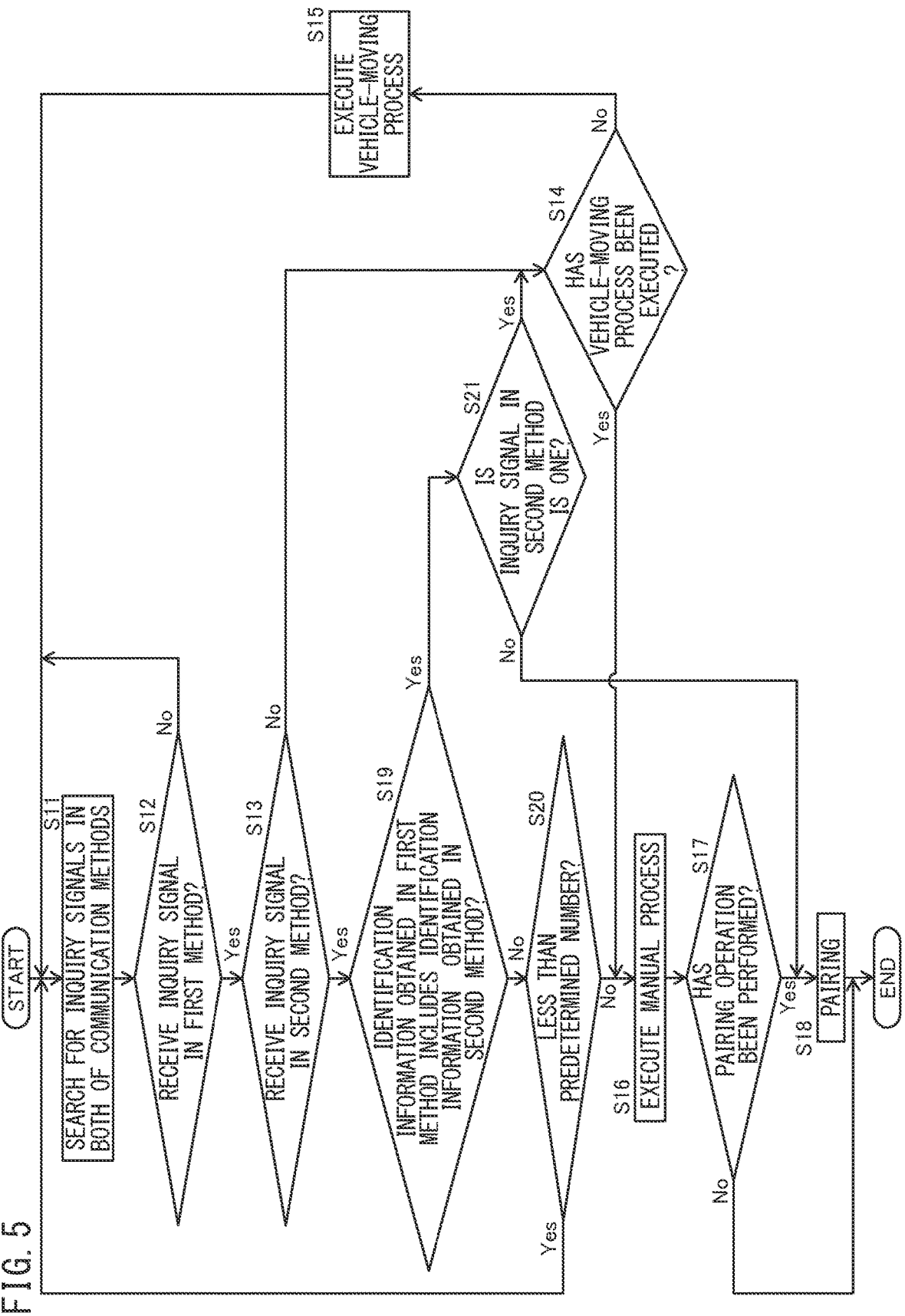
FIG. 5 is a flowchart showing a flow of a pairing process for pairing a vehicle with a ground power supply device.

FIG. 5 is a flowchart showing a flow of a pairing process for pairing the vehicle 4 with the ground power supply device 3. The pairing process is executed by the ECU 49 of the vehicle 4. In the present embodiment, the pairing process shown in FIG. 5 is started when the vehicle 4 is stopped after the vehicle 4 is stopped in one parking section of the charging station 2. The timing when the vehicle 4 is stopped includes, for example, a timing when a stop button of the vehicle 4 is pressed by an occupant, or a timing when an ignition key is turned off by an occupant.

In the present embodiment, the pairing process is started when the vehicle 4 is stopped, but the pairing process may be started at a timing different from the timing when the vehicle 4 is stopped as long as the vehicle 4 is close to the ground power supply device 3. Specifically, the pairing process may be started, for example, when the vehicle 4 enters the charging station or when the vehicle 4 stops in the charging station 2 (before the vehicle 4 is stopped).

When the pairing process is started, the ECU 49 searches for an inquiry signal received in the first communication method and the second communication method (step S11). That is, the ECU 49 searches for the ground power supply device 3 that can communicate by both communication methods. When the vehicle-side first communication device 44 receives the inquiry signal, the received inquiry signal is inputted to the ECU 49 from the vehicle-side first communication device 44. Similarly, when the vehicle-side second communication device 45 receives the inquiry signal, the received inquiry signal is inputted to the ECU 49 from the vehicle-side second communication device 45. The ECU 49 searches for the inquiry signal inputted the communication devices 44 and 45 in this way.

When the search is performed in step S11, the ECU 49 then determines whether or not the vehicle-side first communication device 44 has received an inquiry signal in the first communication method (step S12). Since the communication according to the first communication method is a communication with low directivity and a certain length of communication distance, when the vehicle is stopped in the charging station 2, a plurality of inquiry signals is usually received. When it is determined in step S12 that the vehicle-side first communication device 44 has not received the inquiry signal in the first communication method, step S11, S12 is repeated. When the vehicle-side first communication device 44 does not receive the inquiry signal in the first communication method even if steps S11, S12 is repeated for a certain number of times, it is highly likely that the place where the vehicle is stopped is not the charging station 2 or that the vehicle-side first communication device 44 has failed. Therefore, in such a case, the pairing process may be terminated without pairing the vehicle 4 with the ground power supply device 3.

When it is determined in step S12 that the inquiry signal in the first communication method is received, the ECU 49 determines whether or not the vehicle-side second communication device 45 has received the inquiry signal in the second communication method (step S13). Since the communication in the second communication method has high directivity and a short communication distance, the vehicle-side second communication device 45 receives an inquiry signal in the second communication method when the vehicle 4 is stopped at a position suitable for power supply from the ground power supply device 3.

When it is determined in step S13 that the vehicle-side second communication device 45 has not received the inquiry signal in the second communication method, the ECU 49 determines whether or not the vehicle-moving process has been executed in the past (step S14). When it is determined in step S14 that the vehicle-moving process has not yet been executed, the ECU 49 executes the vehicle-moving process for moving the vehicle 4 described above (step S15). When the vehicle 4 is stopped again after the vehicle 4 has moved, the ECU 49 searches for an inquiry signal in the first communication method and the second communication method again (step S11).

On the other hand, if it is determined in step S14 that the vehicle-moving process has been executed in the past, the ECU 49 executes a manual process for causing the occupant to manually pair (step S16). The manual process is a process for prompting an occupant to perform a pairing operation manually. Specifically, the ECU 49 displays, as a manual process, for example, a plurality of pieces of identification information corresponding to the inquiry signals received in the first communication method, as an option on the display of the HMI 48. In this case, the occupant selects, from the identification information displayed in the HMI 48, the identification information of the ground power supply device 3 corresponding to the parking section in which the vehicle 4 is stopped. Alternatively, the ECU 49 displays, as a manual process, an input field for inputting, for example, identification information (for example, identification number) of the ground power supply device 3 on the display of the HMI 48. In this case, the occupant inputs the identification information of the ground power supply device 3 corresponding to the parking section in which the vehicle 4 is stopped by means of the HMI 48.

When the manual process is executed in step S16, the ECU 49 determines whether or not a pairing operation by the occupant has been performed (step S17). That is, the ECU 49 determines whether or not the occupant has performed the pairing operation prompted by the manual process in step S16. Specifically, when the identification information option is displayed on the display in the manual process, the ECU 49 determines that the pairing operation by the occupant has been performed when the identification information is selected by the occupant. Further, when the input field of the identification information is displayed on the display in the manual process, the ECU 49 determines that the pairing operation by the occupant has been performed when the identification information is input by the occupant. When it is determined in step S17 that the pairing operation by the occupant has not been performed for a certain period, the ECU 49 ends the pairing process. When it is determined that the pairing operation by the occupant has been performed in step S17, the ECU 49 pairs the vehicle 4 with the ground power supply device 3 corresponding to the identification information specified by the pairing operation (step S18). In addition, when the vehicle 4 and the ground power supply device 3 are paired, the ECU 49 transmits a pairing notification to the corresponding ground power supply device 3 via the vehicle-side first communication device 44.

When it is determined in step S13 that the vehicle-side second communication device 45 has received the inquiry signal in the second communication method, the ECU 49 determines whether or not the identification information included in the inquiry signal received by the first communication method includes the identification information included in the inquiry signal received by the second communication method (step S19). When it is determined in step S19 that the identification information obtained by the first communication method does not includes the identification information obtained by the second communication method, it is determined whether or not the number of times of such determination is performed is equal to or less than a predetermined number of times (step S20). If it is determined in step S20 that the number of times of such determination is performed is equal to or less than the predetermined number of times, the ECU 49 searches for an inquiry signal in the first communication method and the second communication method again (step S11). On the other hand, in step S20, when it is determined that the determination that the identification information obtained by the first communication method does not includes the identification information obtained by the second communication method is repeatedly performed more than a predetermined number of times, the ECU 49 executes a manual process for causing the occupant to manually pair (step S16).

As described above, in the present embodiment, when the identification information included in the inquiry signal received by the communication according to the second communication method is not included in the identification information in the inquiry signal received by the communication according to the first communication method, a manual process for causing the occupant of the vehicle to manually pair is performed. As a result, in such a case, erroneous pairing is suppressed.

When it is determined in step S19 that the identification information obtained by the first communication method includes the identification information obtained by the second communication method, the ECU 49 determines whether or not only one inquiry signal is received by means of the second communication method (step S21). When it is determined in step S21 that only one inquiry signal is received by the second communication method, it is considered that the vehicle 4 is appropriately stopped on the ground power supply device 3, and therefore the ECU 49 pairs the vehicle 4 with the ground power supply device 3 corresponding to the identification information included in the inquiry signal received by the second communication method (step S18).

On the other hand, if it is determined in step S21 that not only one inquiry signal, but also a plurality of inquiry signal are received by means of the second communication method, it is considered that the vehicle 4 is not appropriately stopped on the ground power supply device 3, and therefore, the vehicle-moving process is executed in step S15 via step S14. Specifically, in such a case, the ECU 49 determines whether or not the vehicle-moving process has been executed in the past (step S14), and when it is determined that the vehicle-moving process has not yet been executed, the ECU 49 executes the vehicle-moving process for moving the vehicle 4 described above (step S15). On the other hand, when it is determined in step S14 that the vehicle-moving process has been executed in the past, a manual process is executed (step S16).

That is, in the present embodiment, although it is determined in step S12 that the inquiry signal (that is, the identification information) is received by the communication according to the first communication method, when it is determined in step S13 that the inquiry signal (that is, the identification information) is not received by the communication according to the second communication method, or when it is determined in step S21 that a plurality of inquiry signals are received, the vehicle-moving process is executed.

Further, in the present embodiment, even though the vehicle-moving process has been executed, when it is determined that the inquiry signal (that is, the identification information) is not received by the communication according to the second communication method in step S13, or when it is determined that a plurality of inquiry signals are received in step S21, the manual process for causing the occupant to manually pair is executed. As described above, when the ground power supply device 3 corresponding to the parking section in which the vehicle 4 is stopped cannot be specified by the communication by the second communication method, the passenger is caused to manually pair, thereby suppressing erroneous pairing.

<Transmission Process>

Next, a power transmission process performed by the controller 35 of the ground power supply device 3 will be described with reference to FIG. 6. FIG. 6 is a flowchart showing a flow of power transmission process. The power transmission process shown in FIG. 6 is started when a pairing notification is received from the corresponding vehicle 4.

When the power transmission process is started, the controllers 35 control the power transmission device 5 to start the power transmission (step S31). Specifically, the controller 35 controls the inverter 52 so as to supply an alternating current to the transmission-side resonance circuit 53. When the power transmission by the power transmission device 5 is started, the controller 35 periodically calculates the transmitted electric power in the power transmission device 5, and periodically transmits the calculated transmitted power to the vehicles 4 via the communication according to the first communication method (step S32). The transmitted electric power is calculated based on various outputs of the ground-side sensor 34.

During power transmission by the power transmission device 5, the controller 35 determines whether or not a power transmission stop instruction has been received from the vehicle 4 via communication by the first communication method (step S33). When it is determined that the power transmission stop instruction has not been received, the power transmission by the power transmission device 5 is continued. On the other hand, when it is determined in step S33 that the power transmission stop instruction is received from the vehicle 4, the controller 35 controls the power transmission device 5 so as to stop the power transmission (step S34). Thereafter, the controllers 35 cancel pairing with the vehicles 4 (step S35).

<Power Receiving Process>

Figure 7:
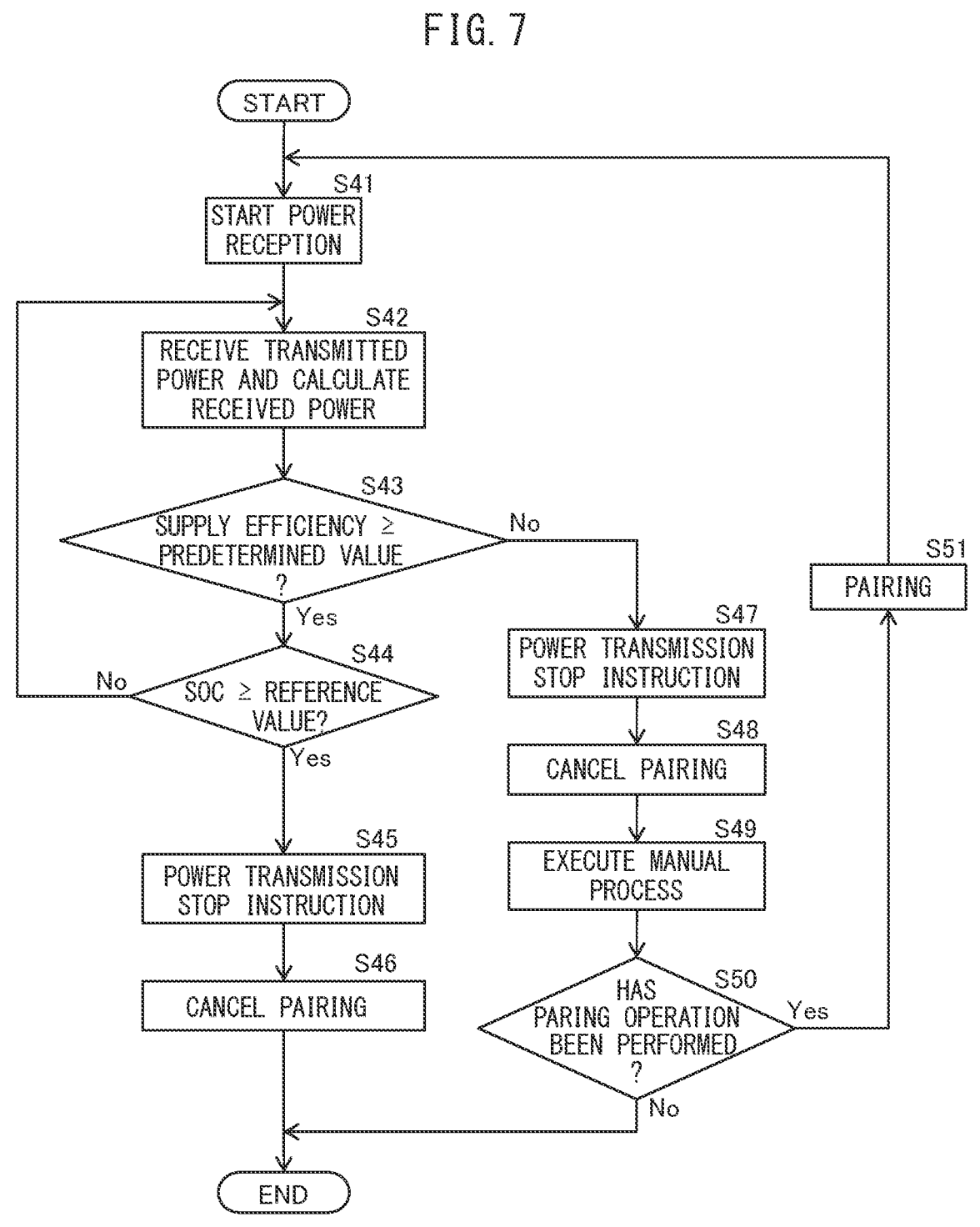

Next, referring to FIG. 7, a power receiving process performed by the ECU 49 of the vehicles 4 will be described. FIG. 7 is a flowchart showing a flow of the power receiving process. The power receiving process shown in FIG. 7 is started when pairing is performed in step S18 of FIG. 5.

When the power receiving process is started, the ECU 49 controls the power reception device 6 to start the power reception (step S41). Specifically, the ECU 49 controls the relay 46 to connect the charge circuitry 65 and the battery 42. When the power reception by the power receiving device 6 is started, the ECU 49 receives the electric power transmitted from the ground power supply device 3 at step S32 and periodically calculates the received electric power in the power receiving device 6 (step S42). The received electric power is calculated based on various outputs of the vehicle-side sensor 47.

During power reception by the power receiving device 6, the ECU 49 determines whether or not the power supply efficiency by the contactless power transmission from the ground power supply device 3 to the vehicle 4 is equal to or higher than a predetermined value (specifically, for example, 70%) (step S43). The power supply efficiency is calculated by dividing the received electric power obtained in step S42 by the transmitted electric power.

When it is determined in step S43 that the power supply efficiency is equal to or higher than the predetermined value, that is, when the power is appropriately supplied from the ground power supply device 3 to the vehicle 4, the ECU 49 then determines whether or not the charge rate (SOC) of the battery 42 has reached the reference value (for example, approximately 100%) or higher (step S44). The charge rate of the battery is detected by, for example, the vehicle-side sensor 47. When it is determined in step S44 that the charge rate is less than the reference value, the power reception by the power receiving device 6 is continued. On the other hand, if it is determined in step S44 that SOC has reached the reference value or more, the ECU 49 transmits a power transmission stop instruction to the ground power supply device 3 via communication according to the first communication method (step S45). At this time, the ECU 49 controls the relay 46 to disconnect the charge circuitry 65 from the battery 42. Thereafter, the ECU 49 cancels pairing with the ground power supply device 3 (step S46).

On the other hand, if it is determined in step S43 that the power supply efficiency is less than the predetermined value, the ECU 49 transmits a power transmission stop instruction to the ground power supply device 3 via communication according to the first communication method (step S47). In addition, the ECU 49 cancels pairing with the ground power supply device 3 (step S48). This is because power is not properly supplied from the ground power supply device 3 to the vehicle 4. In particular, in such a case, there is a possibility that the vehicle 4 and the ground power supply device 3 corresponding to the parking section of the vehicle 4 could not be properly paired. Therefore, in such a case, the ECU 49 executes a manual process for causing the occupant to manually pair as in step S16 (step S49). That is, in the present embodiment, the ECU 49 calculates the power supply efficiency from the ground power supply device 3 to the vehicle 4 when power is supplied from the ground power supply device 3 to the vehicle 4, and causes the vehicle-side first communication device 44 to transmit the power transmission stop instruction to the ground power supply device 3 when the calculated power supply efficiency is less than the predetermined value.

When the manual process is executed in step S49, the ECU 49 determines whether or not the pairing operation by the occupant has been performed as in step S17 (step S50). When it is determined that the pairing operation has been performed in step S50, the ECU 49 pairs the vehicle 4 and the ground power supply device 3 corresponding to the identification information specified by the pairing operation, as in step S18 (step S51). On the other hand, if it is determined in step S50 that the pairing operation has not been performed, the ECU 49 ends the power reception process.

<Modification>

The ground power supply device 3 and the vehicle 4 may further include a communication device that performs wide-area wireless communication in addition to the first communication devices 32 and 44 and the second communication devices 33 and 45. The wide-area wireless communication is a communication having a communication distance longer than that of the short-range wireless communication, and specifically, for example, a communication having a communication distance of 10 meters to 10 kilometers. As wide-area wireless communication, various types of wireless communication having a long communication distance can be used, and for example, communication conforming to any communication standard such as 4G, LTE, 5G, WiMAX developed by 3GPP or IEEE is used. In this case, instead of the communication of the first wireless communication method by the first communication devices 32 and 44, the information related to the power transmission may be transmitted and received by wide-area wireless communication.

Further, in the above-described embodiment, the vehicle 4 is a vehicle in which a driving operation is performed by an occupant. However, the vehicle 4 may be an autonomous vehicle in which the ECU 49 performs the driving maneuver at least partially automatically. In this case, the vehicle-moving process executed in step S15 may be a process in which the ECU 49 automatically moves the vehicle 4.

Further, in the above-described embodiment, when it is determined in step S13 that the inquiry signal is not received by the communication according to the second communication method, or when it is determined in step S21 that a plurality of inquiry signals is received, the vehicle-moving process is executed. However, even in such a case, the pairing process may be terminated without executing the vehicle-moving process. Alternatively, in such a case, the manual process of step S16 may be executed without executing the vehicle-moving process.

While preferred embodiments according to the present disclosure have been described above, the present disclosure is not limited to these embodiments, and various modifications and changes can be made within the scope of the claims.

The invention claimed is:

1. A vehicle capable of receiving electric power from a ground power supply device, comprising:

a first communication device that wirelessly communicates with the ground power supply device by means of a first communication method;

a second communication device that wirelessly communicates with the ground power supply device by means of a second communication method having a higher directivity than the first communication method; and a control device connected to the first communication device and the second communication device, wherein the control device is configured to pair the vehicle and the ground power supply device when the control device receives identification information of the same ground power supply device by communication in the first communication method and communication in the second communication method.

2. The vehicle according to claim 1, wherein the control device is configured to execute a vehicle moving process for moving the vehicle when the control device does not receive the identification information of the ground power supply device by communication in the second communication method or the control device receives the identification information of a plurality of ground power supply devices by communication in the second communication method, even though the control device receives identification information of the ground power supply device by communication in the first communication method.

3. The vehicle according to claim 2, wherein the control device is configured to execute a manual process for causing an occupant of the vehicle to manually pair when the control device does not receive the identification information by the communication in the second communication method or when the control device receives the identification information of the plurality of ground power supply devices by the communication in the second communication method, even though the vehicle moving process has been executed.

4. A vehicle according to claim 1, wherein the control device is configured to execute a manual process for causing an occupant of the vehicle to manually pair, when the identification information of the ground power supply device received by communication in the second communication method is not included in the identification information of the ground power supply device received by communication in the first communication method.

5. The vehicle according to claim 1, wherein the control device is configured to calculate a power supply efficiency from the ground power supply device to the vehicle when electric power is supplied from the ground power supply device to the vehicle, and make the first communication device transmit a power transmission stop instruction to the ground power supply device when the calculated power supply efficiency is less than a predetermined value.

6. The vehicle according to claim 1, wherein the communication in the second communication method is one-way communication from the ground power supply device to the second communication device.

7. The vehicle according to claim 1, wherein a communication speed according to the second communication method is lower than a communication speed according to the first communication method.

8. The vehicle according to claim 1, wherein the second communication method is communication using infrared rays or ultrasonic waves.

* * * * *